United States Patent [19]

Huegli

[11] 4,249,341
[45] Feb. 10, 1981

[54] PACKAGE FOR SPROUTS

[76] Inventor: Ronald W. Huegli, Beaverton, Oreg.

[21] Appl. No.: 70,152

[22] Filed: Aug. 27, 1979

[51] Int. Cl.³ .............................................. A01C 1/00
[52] U.S. Cl. ............................................ 47/14; 47/61
[58] Field of Search ............... 47/14, 16, 61; D11/155

[56] References Cited

U.S. PATENT DOCUMENTS

| D. 242,267 | 11/1976 | Feeney | 47/14 X |
| 4,180,941 | 1/1980 | Korematsu | 47/14 |

FOREIGN PATENT DOCUMENTS

| 867118 | 5/1961 | United Kingdom | 47/16 |
| 1274416 | 5/1972 | United Kingdom | 47/14 |

Primary Examiner—Robert E. Bagwill
Attorney, Agent, or Firm—Kolisch, Hartwell & Dickinson

[57] ABSTRACT

A container for sprouting seeds hydroponically without water build-up causing root rot. The container includes a bottom portion joined to side walls, a bendable seed-holding tray and a conventional cover. The bottom portion has ribs for supporting the tray for limited free angulation to different nonhorizontal positions, and the side walls have channels to allow water run-off.

8 Claims, 3 Drawing Figures

U.S. Patent
Feb. 10, 1981
4,249,341
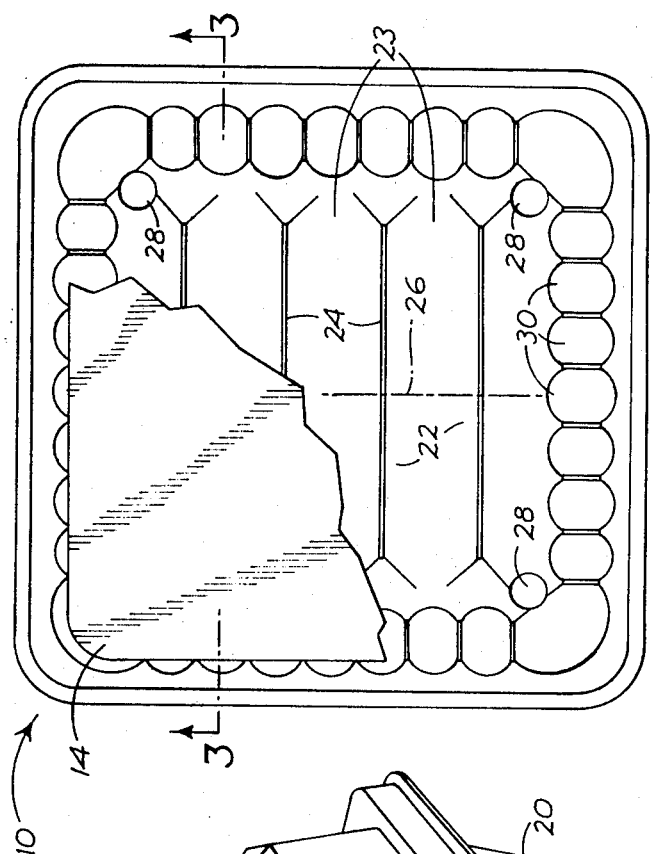
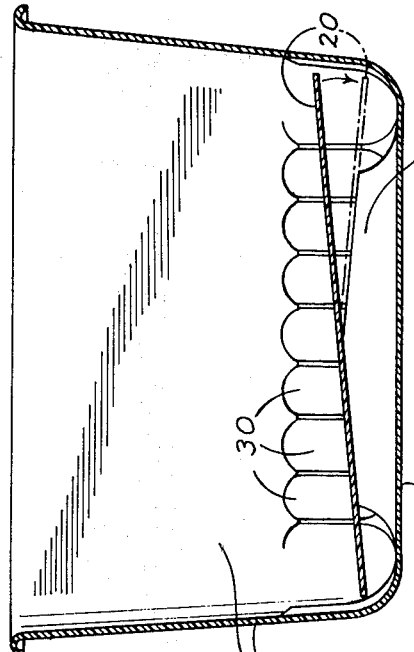
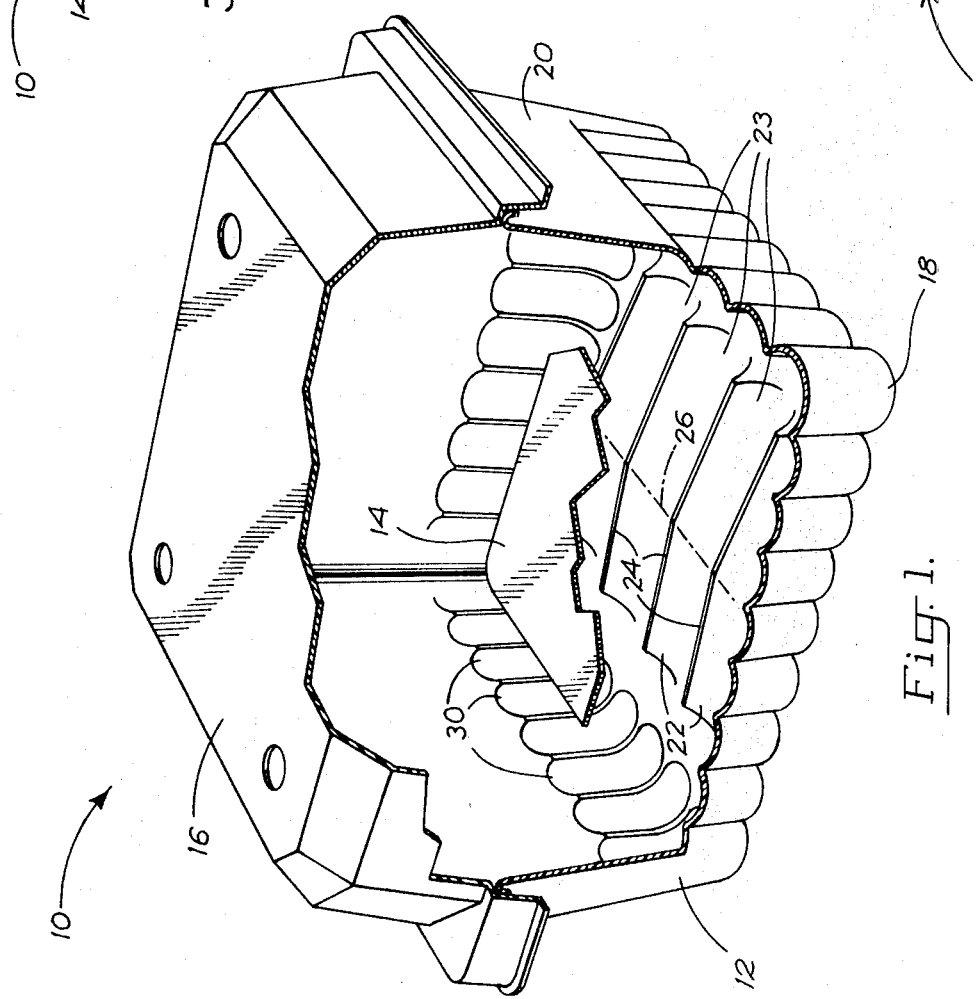

PACKAGE FOR SPROUTS

BACKGROUND OF THE INVENTION

Growing sprouts from seeds, such as alfalfa, hydroponically (without the use of soil) has become very popular. Various sprouts are grown commercially and sold to food markets.

The growing of sprouts is generally accomplished by placing seeds in large trays and watering them. The trays may be covered with plastic wrap to retain humidity and promote germination. A concern in growing sprouts in the above-described manner is that excessive water accumulation in a tray causes root rot and deterioration to the sprouting plant. Another concern is that growing sprouts in large trays necessitates repackaging the sprouts for resale. This obviously takes time, is costly, and reduces sprout shelf life.

A general object of this invention, is to provide a container for sprouting seeds hydroponically without the danger of water accumulation.

Another object of the invention is to provide a container having a size suitable for growing as well as retailing sprouts.

More specifically, an object of this invention is to provide a container with a bottom portion having drain openings, and a series of parallel upward facing ribs, and side portions, joined to the bottom portion, having a plurality of indentations forming vertically disposed channels.

A further object of the invention is to provide a seed-holding tray removably placeable upon the above-mentioned ribs, with the edges of the tray abutting the channels in the side portions. With the tray in place, the sloping ridges of the ribs cause the tray to assume a nonhorizontal, rocked or bent disposition which facilitates water run-off to edges of the tray, and thence out of the container by way of the vertical channels and the drain openings.

DESCRIPTION OF THE DRAWINGS

FIG. 1 is a fragmentary perspective view of a sprouting container constructed in accordance with the invention.

FIG. 2 is a top plan view of the container of FIG. 1 with portions of a tray therein broken away.

FIG. 3 is a cross-sectional view taken generally along the line 3—3 in FIG. 2.

DETAILED DESCRIPTION OF THE INVENTION

Turning now to the drawings, and referring first to FIG. 1, indicated generally at 10 is a device for sprouting seeds including a container 12, and a cooperative seed-holding tray 14 constructed in accordance with the present invention. Also shown in this figure is a cover 16 which is removably fitted in an operative position on the container.

Considering the construction of container 12, and referring to FIGS. 2 and 3 along with FIG. 1, the container takes the form generally of a unitary, rectilinear, open-topped box defined by a base 18 which joins into four side walls 20. While many different materials may be used for the container, container 12 herein is formed of a suitable, translucent, molded plastic material. Base 18 includes a plurality of upwardly facing, spaced, elongated, substantially parallel ribs 22, with lower portions thereof defining valleys 23 separating adjacent ribs.

Each rib 22 has a crest 24 which slopes upwardly, from each end, to a point lying along an imaginary center line 26 extending transverse to the longitudinal axes of the ribs. Also included in base 18 are openings 28 for draining fluid from valleys 23. Side walls 20 join with the perimeter of base 18 through a fluted skirt region including plural channels, such as channels 30.

Freely removably placed on ribs 22, for angulation about line 26, is previously mentioned tray 14. The edges of the tray cooperate with channels 30 to define means for allowing fluid drainage from tray 14 to valleys 23.

Considering now the performance of the invention, with the seed-holding tray in place, and cover 16 removed, a predetermined amount of seeds, such as alfalfa seeds, is placed on the tray, and watered or placed in a humidifier. The tray, with the relatively light load therein produced by the seeds, naturally angulates to slope in one direction about line 26 (see the solid line showing of the tray in FIG. 3). With such angulation excess water on the seeds drains toward the lowermost edge of the tray, and then through channels 30 and valleys 23 to drain openings 28.

As the seeds sprout and grow heavier, their weight forces the tray to bend about line 26, thus to slope downwardly on both sides of this line, thereby allowing water to drain from two edges of the tray (see the dash-dot line showing for the right side of tray 14 in FIG. 3).

When the seeds have fully sprouted, cover 16 is fitted, and the resulting unit is ready for transport and marketing display.

While a preferred embodiment of the invention has been described herein, it is appreciated that variations and modifications may be made.

For example, a variation on the above-described ribbed base of the container would be to provide a base having a plurality of columnar supports for the seed-holding tray, with a center column having an elevation higher than the elevation of the other columns. A tray placed upon the center column would have practically unlimited angulation capability. The lower columns would prevent the tray from blocking drain openings.

It is claimed and desired to secure by Letters Patent:

1. In a container for sprouting seeds which require watering during sprouting
    a generally planar seed tray,
    fulcrum means supporting said tray at a supported region therein for limited free angulation to different inclined dispositions wherein edges in the tray have elevations differing from the elevation of said supported region, and
    port means adjacent said edges for draining liquid from said tray.

2. The container of claim 1, wherein said support region is linear.

3. A sprouting container for seeds comprising
    a bottom portion having a plurality of spaced upward facing elongated substantially parallel ribs, with lower portions thereof defining valleys separating adjacent ribs, each of said ribs having a crest which, progressing inwardly from opposite ends of the rib, slopes upwardly toward a point intermediate such ends, said points lying along a line extending transverse to the longitudinal axes of said ribs,
    side walls joined to said bottom portion, and
    a seed-holding tray removeably placeable on said ribs, edge portions of said tray, with the tray in place, cooperating with portions in said side walls to define means allowing fluid drainage from said tray to said valleys.

4. The container of claim 3, wherein the line containing said points defines a rock axis for said tray.

5. The container of claim 4, which is for sprouting seeds having a preselected minimum size, and said means allowing fluid drainage includes port means having a size smaller than said predetermined size.

6. The container of claim 3, which is for sprouting seeds having a preselected minimum size, and said means allowing fluid drainage includes port means having a size smaller than said predetermined size.

7. The container of claim 3, which further includes means in said valleys defining openings for draining fluid from the valleys.

8. A sprouting container for seeds comprising a bottom portion having a plurality of upward facing elongated substantially parallel ribs, with lower portions thereof defining valleys separating adjacent ribs, each of said ribs having a crest which, progressing inwardly from opposite ends of the rib, slopes upwardly toward a point intermediate such ends, said points lying along a line extending transverse to the longitudinal axes of said ribs, side walls joined to said bottom portion including means defining a plurality of laterally spaced upwardly directed channels, and a seed-holding tray removeably placeable on said ribs for rocking about the line defined by said points, edge portions of said tray, with the tray in place, cooperating with said channels to define fluid drainage passages distributed along the periphery of the tray.

* * * * *